April 10, 1951 K. J. VAN SICKLE 2,548,329
PICKUP REEL FOR HARVESTERS
Filed Jan. 5, 1946 3 Sheets-Sheet 1

INVENTOR.
Kenneth J. Van Sickle
BY
Edward H. Cumpston
his Attorney

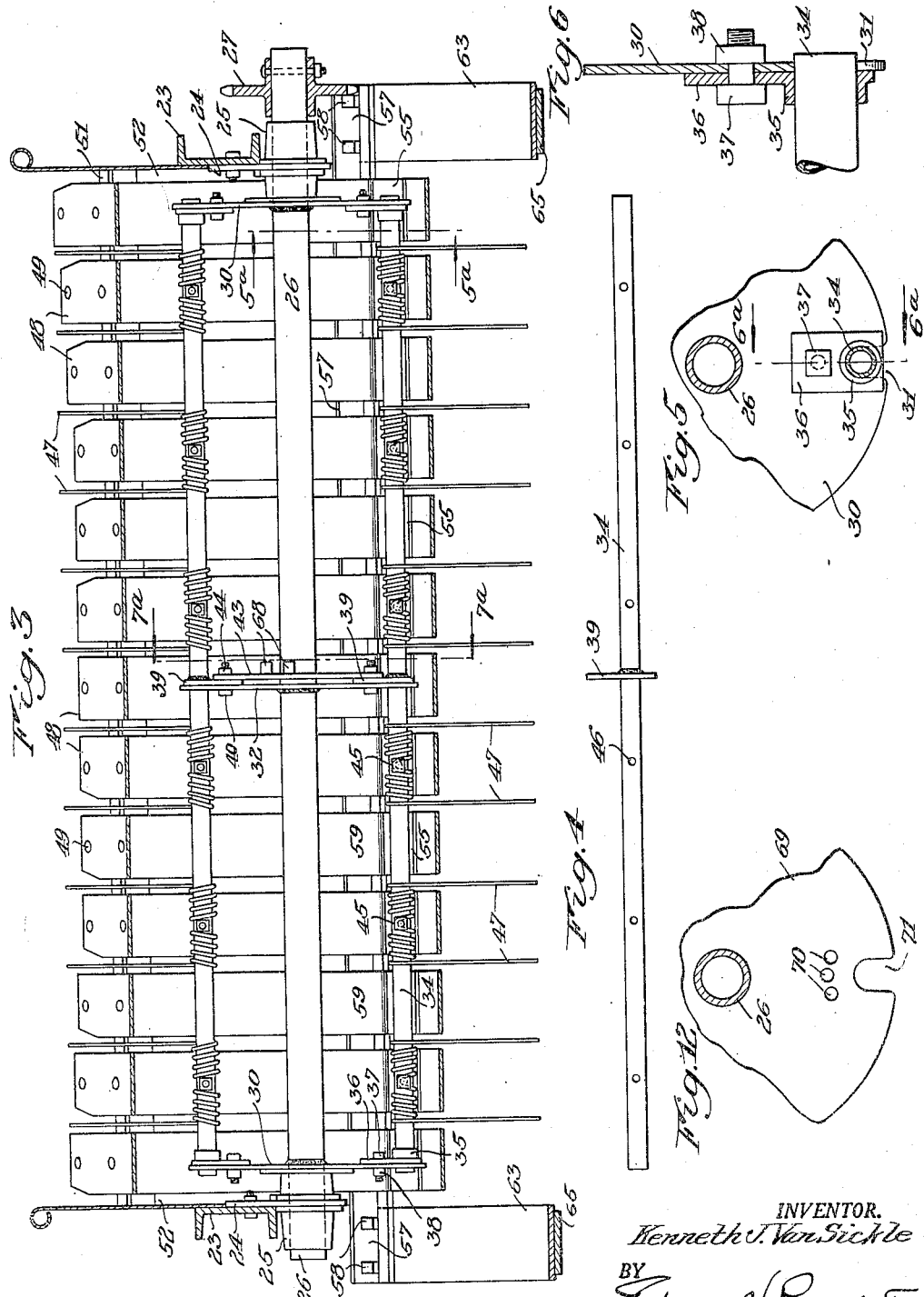

April 10, 1951 K. J. VAN SICKLE 2,548,329
PICKUP REEL FOR HARVESTERS
Filed Jan. 5, 1946 3 Sheets-Sheet 3
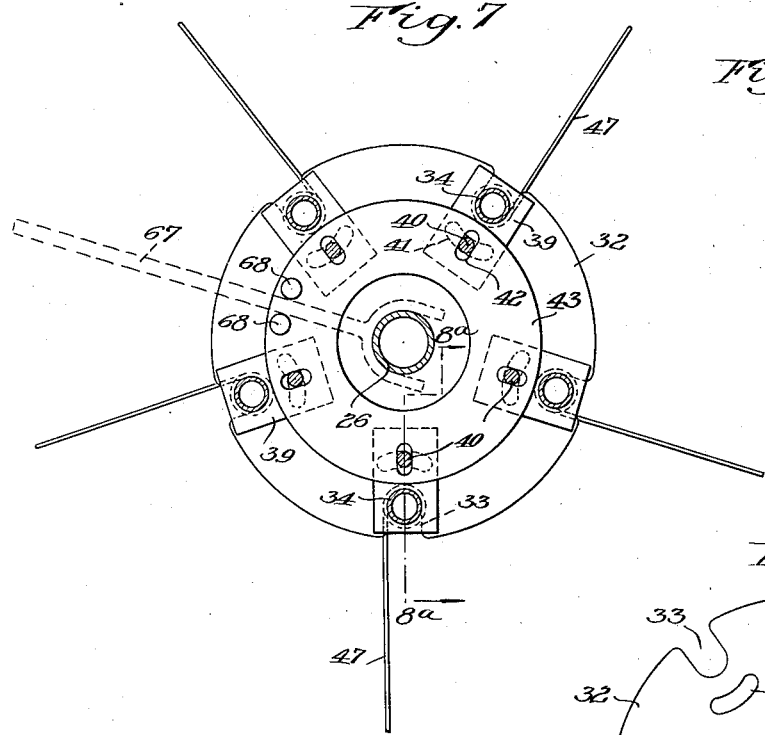
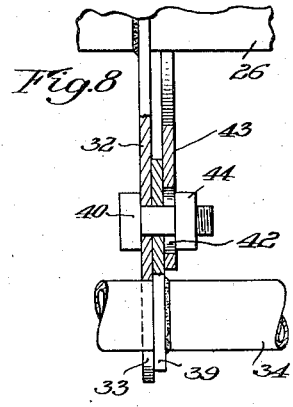
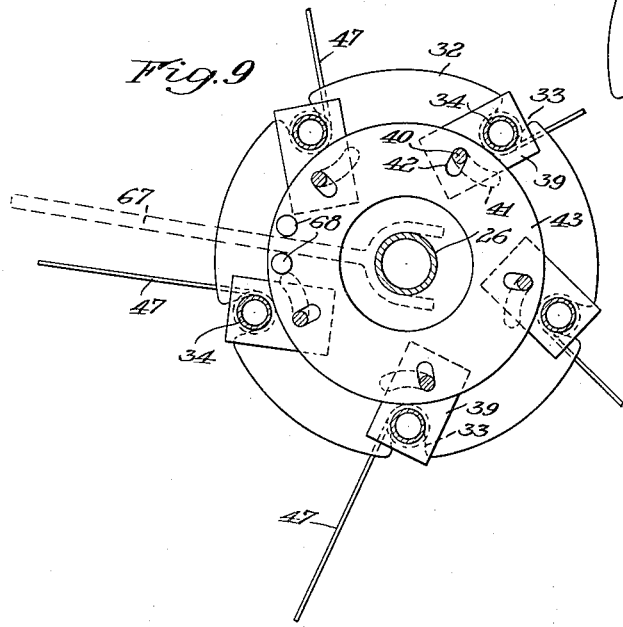
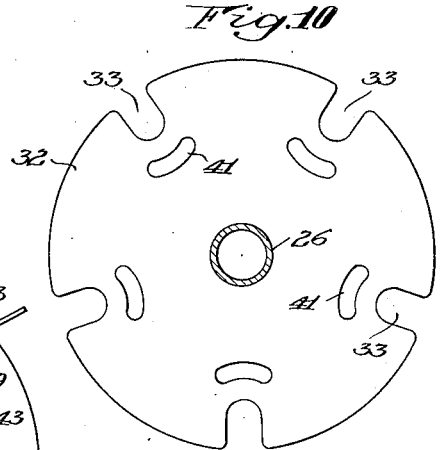
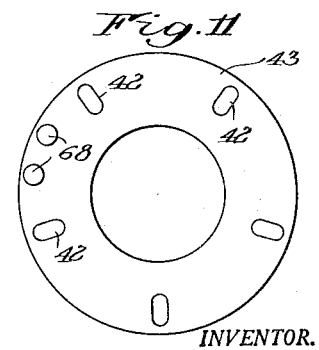
INVENTOR.
Kenneth J. Van Sickle
BY Edward H. Cumpston
his Attorney Patented Apr. 10, 1951

2,548,329

UNITED STATES PATENT OFFICE 2,548,329

PICKUP REEL FOR HARVESTERS

Kenneth J. Van Sickle, Shortsville, N. Y., assignor to Papec Machine Company, Shortsville, N. Y., a corporation of New York Application January 5, 1946, Serial No. 639,178

11 Claims. (Cl. 56—364)

This invention relates to harvesting machines and, more particularly, to pick-up reels for picking up crops from the ground and supplying them to the machines, one object of the invention being to provide an improved pick-up reel having a more simple, practical and efficient type of construction.

Another object is to provide such a reel having the pick-up finger parts thereof constructed and arranged so as to be readily detachable for repair or replacement.

Another object is the provision of a reel of the above character having its parts so constructed and arranged as to provide for convenient adjustment of the angularity of the pick-up fingers to suit varying operating conditions.

To these and other ends the invention resides in certain improvements and combinations of parts, all as will be hereinafter more fully described, the novel features being pointed out in the claims at the end of the specification.

In the drawings:

Fig. 3 is a front elevation, partly in section, on the line 3a—3a in Fig. 2, showing the pick-up reel and associated parts;

Fig. 4 is a view of one of the arbors of the reel detached;

Fig. 5 is a sectional elevation on the line 5a—5a in Fig. 3;

Fig. 6 is an enlarged section on the line 6a—6a in Fig. 5;

Fig. 7 is an enlarged, sectional elevation on the line 7a—7a in Fig. 3;

Fig. 8 is an enlarged, sectional view on the line 8a—8a in Fig. 7;

Fig. 9 is a view similar to Fig. 7, but showing the arbors and pick-up fingers in a different position of adjustment;

Fig. 10 shows one of the disk parts of the reel, detached for better illustration;

Fig. 11 shows a ring for adjusting the pick-up fingers, detached for better illustration, and Fig. 12 shows a modified form of the reel disk shown in Fig. 10.

Figure 1:
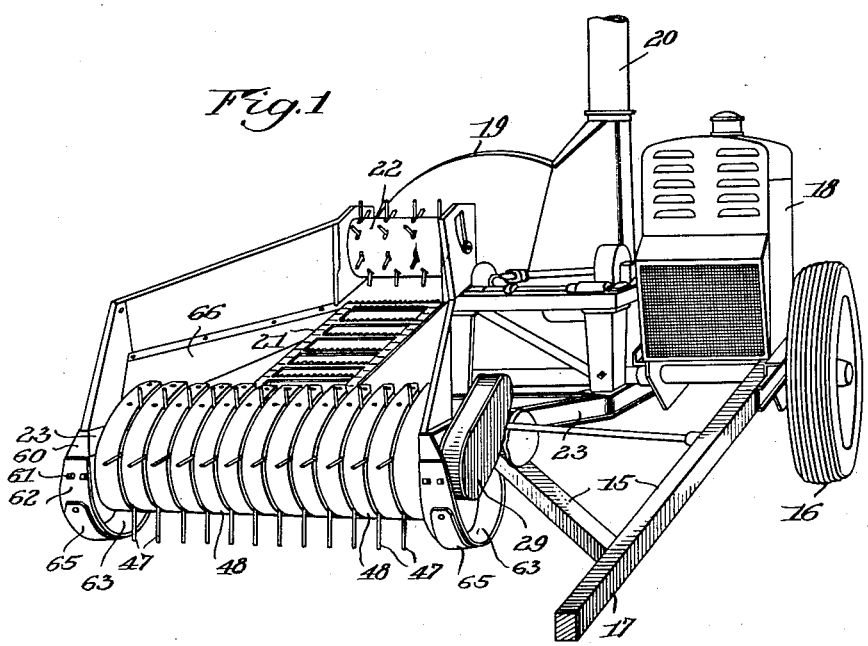
Fig. 1 is a perspective view, partly broken away, of a harvester provided with a pick-up reel embodying the present invention.

The invention is disclosed in the present instance, by way of illustration, as applied to a machine of the hay harvesting type, although it will be understood that the invention may be applied as well to other types of harvesters. The present machine has a frame 15 (Fig. 1), mounted on ground wheels 16 and provided with a draft bar 17. Mounted on the frame is a motor housed in a casing 18 and having suitable driving connections with a combined cutter and blower wheel in a casing 19 having a spout 20 for discharging the crop cuttings, as well understood in the art. Mounted on the frame also are a conveyor belt 21 and a feed drum 22, by means of which the crop is fed to the throat of the cutter and blower, these elements, however, being of any known or suitable construction and forming no part of the present invention.

Figure 2:
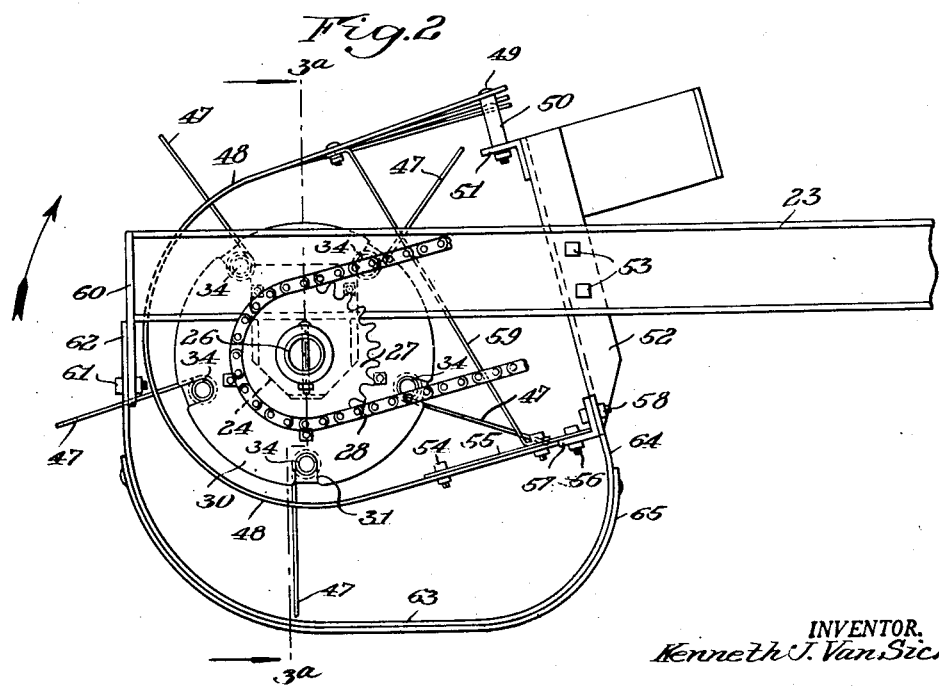
Fig. 2 is an enlarged end elevation of the pick-up reel, with parts broken away.

Projecting forwardly from the machine frame 15, one at each side, are supporting beams 23, preferably of channel shape, as shown. Fixed on and depending from the forward end of each beam is a hanger bracket plate 24 (Figs. 2 and 3), each supporting a self-aligning bearing 25. Rotatably mounted at its ends in these bearings is a tubular drive shaft 26, which carries and rotates the pick-up reel. Fixed on one end of the drive shaft is a sprocket gear 27 with which meshes a sprocket chain 28 in a housing 29 (Figs. 1 and 2), meshing at its other end with driving means of any suitable construction connected with the motor, for rotating shaft 26 and the pick-up reel.

Fixed on shaft 26, one adjacent each end thereof, are members 30, preferably in the form of circular plates or disks (Figs. 2 and 3), each having its periphery formed with a plurality of circumferentially spaced seats preferably in the form of radially extending, outwardly opening slots 31 (Fig. 2) the inner ends of which are of semi-circular shape to fit the arbors hereafter described. A similar disk 32 is fixed on shaft 26, intermediate the disks 30 and preferably adjacent the center of the shaft, as shown in Fig. 3, this disk being formed peripherally with similar seats or slots 33. A plurality of arbors, conveniently made in lengths of piping 34, are supported in aligned slots 31 and 32 of the reel disks 30 and 32, respectively, in an adjustable and releasable manner, as hereafter described.

Rotatably supporting each end of each arbor 34 is the hub 35 of arm 36 conveniently made of metal plate and lying against the corresponding disk 30. A bolt 37 is passed through closely fitting openings in disk 30 and arm 36 and secured by means of a nut 38. By means of this arrangement, each end of each arbor 34 is rotatably supported in its seat or slot 31 in the corresponding end disk 30. By removing nut 38 and bolt 37, however, the arbors may be readily removed from the open slots of the disks.

A different means is provided for connecting each arbor with the intermediate disk 32 of the drive shaft, comprising an arm 39 in the form of a metal plate fixed on the arbor and provided with an opening for closely receiving and fitting a bolt 40. Each bolt 40 has a sliding fit in an arcuate slot 41 located in disk 32 inwardly of each arbor receiving seat or slot 33, the arcuate slot 41 being concentric with the inner end of slot 33 and the arbor seated therein, so that the arbor may rotate or rock in the seat as bolt 40 is slidably adjusted laterally in arcuate slot 41.

For adjusting the bolts 40 in slots 41, the bolts are passed also through outwardly or radially extending slots 42 in a ring 43 of metal plate surrounding drive shaft 26, but preferably without contact therewith. Slots 42 intersect or cross the arcuate slots 41 and a rotary adjusting movement of ring 43 serves to slide the bolts 40 in slots 41 and rotate or rock the arbors 34 in their seat slots 33 in disk 32, so as to adjust the angularity of the pick-up fingers hereafter described. These parts are secured or clamped in adjusted position by means of nuts 44 on bolts 40.

The pick-up fingers may have any known or suitable construction, being preferably of the known resilient wire type. That is, a length of resilient wire is fixed at its central portion by bolt or other clamping means 45 (Fig. 3), fixed in an opening 46 in the arbor. At opposite sides of the clamping means 45, the wire is coiled about the arbor and terminates in a pair of spaced, projecting resilient tines or fingers 47, as well understood in the art. As the drive shaft and its reel rotate, these fingers 47 move through the intervals between a series of curved stripper plates 48, fixed at their upper ends, as by means of bolts 49 and spacer sleeves 50, to a transversely extending angle bar 51, welded or otherwise fixed at each end to an upright angle bar 52 secured to each of the frame channels 23 as by means of bolts 53. The lower ends of stripper plates 48 are attached by bolts 54 to a plate 55 secured to bolts 56 to an angle bar 57 extending transversely of the machine and bolted to the lower ends of the upright bars 52. A brace plate 59 preferably has its ends detachably bolted to the opposite ends of the stripper plates to stiffen the same. Any one or more of these stripper plates may be readily removed by removing the bolts securing the same to the frame, for the purpose of obtaining access to the enclosed reel.

The frame channels 23 are provided with ground engaging shoes for regulating the vertical position of the pick-up reel, for which purpose the forward ends of the channels carry depending brackets 60, to each of which is bolted, at 61, a band curving downwardly and rearwardly with a flattened ground engaging portion 63 and an upwardly turned rear end 64 secured by bolts 58 to the cross bar 57. This band is preferably protected by an attached wear plate 65.

It will be evident from the above description that in the forward travel of the harvester, the drive shaft 26 is rotated and rotates the reel and its pick-up fingers which pass in close proximity to the ground and pick up the crop for delivery to the receiving chute 66 and the conveyor 21 and cutter. In case operating conditions may require the angular adjustment of the fingers 47, as from the radial position shown in Fig. 7 to the advanced position shown in Fig. 9, one or more of the stripper plates 48 are removed, bolts 40 of the intermediate disk 32 are loosened and ring 43 is rotated to the position shown in Fig. 9, thereby simultaneously rotating all of the arbors 34, after which nuts 44 of bolts 40 are again tightened to clamp the parts in adjusted position. A forked tool 67 may be provided (Fig. 7) for engagement at its forked end with the drive shaft 26, while its shank is engaged between a pair of lugs 68 on ring 43 for turning the latter to make the adjustments described above after which the tool is removed.

In case it is desired to remove one or more of the arbors from the machine for repair or replacement, bolts 37 are removed from the end disks 30 and bolts 40 from the intermediate disk 32, after which any arbor may be removed from the seats or notches in the disk. The spring fingers 47 may then be loosened and slid off either end of the arbor, or the arbor as a whole may be removed from the machine.

A modified construction of disk 32 is shown at 69 in Fig. 12 in which the arcuate slots 41 of disk 32 are replaced by a series of arcuately arranged, spaced bolt openings 70, spaced inwardly from each peripheral seat or notch 71. The bolt 40 of arm 39 of each arbor is passed through and secured in one or the other of these openings 70, for fixing each arbor independently, in a desired position of adjustment for suitably inclining the pick-up fingers as described above.

It is evident from the above description that the invention provides a harvester pick-up reel, of a simple, rugged and practical nature, having a construction and arrangement of parts by means of which its pick-up fingers may be readily adjusted for engagement at suitable angles with the crop under various conditions of operation, the finger arbors being all adjusted simultaneously in the construction first described and independently in the modified construction of Fig. 12. Any one or more of the finger arbors may be readily released and removed from its seats in the reel disks, for removal of one or more of the finger assemblies, or the arbor as a whole, thus facilitating maintenance and continuous and effective operation of the machine. The construction, furthermore, is of such a character that it may be readily manufactured at a relatively low cost.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A pick-up reel for harvesters comprising a driving shaft, a plurality of spaced parallel members mounted concentrically on said shaft for rotation thereby, said members being formed peripherally with a plurality of outwardly opening, spaced seats, arbors detachably mounted for rotary adjustment in said seats, pick-up fingers on said arbors, means for rotarily adjusting all of said arbors simultaneously in said seats, and means for releasably securing said arbors in rotarily adjusted positions.

2. A pick-up reel for harvesters comprising a driving shaft, a plurality of disks fixed in spaced parallel relation on said shaft, said disks having their peripheries formed with a plurality of outwardly opening, spaced slots, arbors detachably and rotatably mounted in said slots, pick-up fingers on said arbors, means for rotatably adjusting all of said arbors simultaneously, and means for releasably securing said arbors in rotarily adjusted positions in said slots.

3. A pick-up reel for harvesters comprising a driving shaft, a member fixed on said shaft adjacent each end thereof, an intermediate member fixed on said shaft, said members having their peripheries provided with a plurality of outwardly opening, spaced seats, a plurality of arbors detachably and rotatably mounted in said seats, pick-up fingers on said arbors, means for adjustably rotating all of said arbors simultaneously, and means for releasably securing said arbors to said intermediate member in different positions of adjustment of said arbors and fingers.

4. A pick-up reel for harvesters comprising a driving shaft, disks fixed on said shaft adjacent the ends and the intermediate portion thereof, each of said disks having its periphery formed with a plurality of outwardly opening, spaced slots, a plurality of arbors detachably and rotatably mounted in said slots, pick-up fingers on said arbors, means for rotatably adjusting the positions of all of said arbors simultaneously, and means for releasably securing said arbors to said intermediate disk in the different adjusted positions thereof.

5. A pick-up reel for harvesters comprising a driving shaft, a plurality of spaced parallel members mounted concentrically and transversely on said shaft for rotation thereby, said members being formed peripherally with a plurality of outwardly opening, spaced seats, arbors detachably mounted for rotary adjustment in said seats, pick-up fingers on said arbors, means detachably connecting said arbors and certain of said members to hold said arbors for rotary adjustment in said seats, and an arm fixed on each of said arbors and detachably and adjustably secured to another of said members for securing said arbors against rotation in said seats in different rotarily adjusted positions therein.

6. A pick-up reel for harvesters comprising a driving shaft, a plurality of spaced parallel members mounted concentrically and transversely on said shaft for rotation thereby, said members being formed peripherally with a plurality of outwardly opening, spaced seats, arbors detachably mounted for rotary adjustment in said seats, pick-up fingers on said arbors, arms rotatably mounted on said arbors and detachably secured to certain of said members to hold said arbors in said seats, an arm fixed on each of said arbors, and detachable connections between said fixed arms and another of said members for securing said arbors against rotation in different positions of rotary adjustment in said seats.

7. A pick-up reel for harvesters comprising a driving shaft, a plurality of disks fixed in spaced relation on said shaft and having their peripheries formed with a plurality of outwardly opening, spaced slots, arbors detachably mounted for rotary adjustment in said slots, pick-up fingers on said arbors, arms rotatably mounted on said arbors and detachably secured to certain of said disks to hold said arbors in said slots, and an arm fixed on each of said arbors and adjustably and detachably secured to another of said disks for securing said arbors against rotation in said slots and securing said fingers in rotarily adjusted positions.

8. A pick-up reel for harvesters comprising a driving shaft, a plurality of disks fixed in spaced relation on said shaft and having their peripheries formed with a plurality of outwardly opening, spaced slots, arbors mounted for rotary adjustment in said slots, pick-up fingers on said arbors, arms rotatably mounted on said arbors and detachably secured to certain of said disks to hold said arbors in said slots, an arm fixed on each of said arbors, and detachable connections between said fixed arms and another of said disks comprising an annular ring for simultaneously adjusting and securing said arms and said arbors and fingers in different adjusted positions.

9. A pick-up reel for harvesters comprising a driving shaft, a plurality of disks fixed in spaced relation on said shaft and having their peripheries formed with a plurality of outwardly opening, spaced slots, arbors mounted for rotary adjustment in said slots, pick-up fingers on said arbors, arms rotatably mounted on said arbors and detachably secured to certain of said disks to hold said arbors in said slots, an arm fixed on each of said arbors, detachable connections between said fixed arms and another of said disks comprising an annular ring for simultaneously adjusting all of said fixed arms relative to said disk, and means for securing said ring in adjusted position for securing said arbors in different positions of rotary adjustment in said slots.

10. A pick-up reel for harvesters comprising a driving shaft, a plurality of disks fixed in laterally spaced relation on said shaft and having their peripheries formed with a plurality of outwardly opening, spaced slots, one of said disks being formed with an arcuate slot spaced inwardly from and concentric with the inner end of each of said outwardly opening slots, arbors mounted for rotary adjustment in said outwardly opening slots, pick-up fingers on said arbors, arms rotatably mounted on said arbors and detachably secured to the others of said disks to hold said arbors in said slots, an arm fixed on each of said arbors, an annular ring formed with radially extending slots intersecting said arcuate slots, and bolts passing through said radially extending and arcuate slots and said fixed arms for simultaneously adjusting and securing all of said arbors and fingers in rotarily adjusted positions.

11. A pick-up reel for harvesters comprising a driving shaft, a plurality of spaced parallel disks mounted concentrically on said shaft for rotation thereby, said disks having their peripheries formed with a plurality of outwardly opening, spaced slots, arbors detachably mounted for rotary adjustment in said slots, pick-up fingers on said arbors, arms rotarily mounted on said arbors and releasably secured to certain of said disks for holding said arbors in said seats, an arm fixed on each of said arbors, and means for adjustably and releasably securing said fixed arms independently to another of said disks for securing said arbors and fingers in different positions of rotary adjustment in said slots.

KENNETH J. VAN SICKLE.

REFERENCES CITED

The following references are of record in the file of this patent:

UNITED STATES PATENTS

| Number | Name | Date |
|---|---|---|
| 1,079,920 | Prugh | Nov. 25, 1913 |
| 1,435,293 | Grieves | Nov. 14, 1922 |
| 1,877,519 | MacGregor | Sept. 13, 1932 |
| 2,115,385 | Edgington | Apr. 26, 1938 |